(12) United States Patent
Zhuang

(10) Patent No.: US 8,593,954 B2
(45) Date of Patent: Nov. 26, 2013

(54) METHOD AND APPARATUS FOR CONTROLLING CONGESTION OF WIRELESS MULTI-HOP NETWORK

(75) Inventor: Hongcheng Zhuang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 358 days.

(21) Appl. No.: 13/007,682

(22) Filed: Jan. 17, 2011

(65) Prior Publication Data

US 2011/0110230 A1  May 12, 2011

Related U.S. Application Data

(63) Continuation of application No. PCT/CN2009/071777, filed on May 13, 2009.

(30) Foreign Application Priority Data

Jul. 16, 2008 (CN) .......................... 2008 1 0068565

(51) Int. Cl.
*H04L 12/26* (2006.01)

(52) U.S. Cl.
USPC ........................ 370/230; 370/338; 370/395.52

(58) Field of Classification Search
USPC ............. 370/229, 230, 230.1, 231, 235, 241, 370/248, 310, 328, 338, 351, 389, 395.1, 370/395.5, 395.52; 455/7, 11.1, 12.1, 13.1
See application file for complete search history.

(56) References Cited

U.S. PATENT DOCUMENTS

| | | | |
|---|---|---|---|
| 6,208,620 | B1 | 3/2001 | Sen |
| 2002/0059435 | A1 | 5/2002 | Border et al. |
| 2003/0117974 | A1 | 6/2003 | Kang |
| 2004/0156345 | A1 | 8/2004 | Steer et al. |

(Continued)

FOREIGN PATENT DOCUMENTS

| | | |
|---|---|---|
| CN | 1476181 A | 2/2004 |
| CN | 1582583 A | 2/2005 |

(Continued)

OTHER PUBLICATIONS

Office action issued in corresponding to EP application No. 09797373.9, dated Dec. 14, 2012, total 5 pages.

(Continued)

*Primary Examiner* — Obaidul Huq
(74) *Attorney, Agent, or Firm* — Leydig, Voit & Mayer, Ltd.

(57) ABSTRACT

A method and an apparatus for controlling congestion of a wireless multi-hop network are disclosed herein. Through this method and apparatus, data packets are transmitted from a fixed host to a mobile base station and from the mobile base station to a mobile host via a wireless path. A local retransmission by the mobile base station is performed according to the wireless path state information after packet(s) is not correctly received by the mobile host, and the retransmission is notified to the fixed host, thus avoiding futile retransmission of the lost packet by the fixed host. The state of the wireless path is marked as available or unavailable or congested or error according to the path information. If the state of the wireless path is not marked as unavailable, the local retransmission is performed at a high priority in response to a first Dup Ack packet received from the mobile host.

20 Claims, 8 Drawing Sheets

(56) References Cited

U.S. PATENT DOCUMENTS

| | | | |
|---|---|---|---|
| 2005/0170841 A1* | 8/2005 | Sagfors | 455/453 |
| 2007/0274268 A1* | 11/2007 | Axelsson et al. | 370/338 |
| 2009/0141631 A1* | 6/2009 | Kim et al. | 370/235 |
| 2009/0141676 A1* | 6/2009 | Maheshwari et al. | 370/329 |
| 2010/0014444 A1* | 1/2010 | Ghanadan et al. | 370/310 |

FOREIGN PATENT DOCUMENTS

| | | |
|---|---|---|
| CN | 1983911 A | 6/2007 |
| CN | 101076962 A | 11/2007 |
| CN | 101088243 A | 12/2007 |
| CN | 101146100 A | 3/2008 |
| WO | 0021231 A2 | 4/2000 |
| WO | 0223819 A2 | 3/2002 |
| WO | 03/092239 A1 | 11/2003 |
| WO | 2007095967 A1 | 8/2007 |

OTHER PUBLICATIONS

Search report of corresponding European Patent Application No. 09797373.9, mailed on Jul. 13, 2011, 7 pages total.

Written Opinion of corresponding PCT Patent Application No. PCT/CN2009/071777, mailed on Aug. 13, 2009, 4 pages total.

International search report for International patent application No. PCT/CN2009/071777, dated Aug. 13, 2009, total 4 pages.

Huo Longshe et al, : "A Distributed PEP2Based TCP Performance Enhancing Protocol for Satellite Net2 works", ISSN 100021239/ CN 1121777/ TP ,dated Nov. 3, 2004, total 8 pages.

* cited by examiner

METHOD AND APPARATUS FOR CONTROLLING CONGESTION OF WIRELESS MULTI-HOP NETWORK

CROSS-REFERENCE TO RELATED APPLICATIONS

This application is a continuation of International Application No. PCT/CN2009/071777, filed on May 13, 2009, which claims priority to Chinese Patent Application No. 200810068565.8, filed on Jul. 16, 2008, both of which are hereby incorporated by reference in their entireties.

FIELD OF THE INVENTION

The present invention relates to communication technologies, and in particular, to a method and an apparatus for controlling congestion of a wireless multi-hop network.

BACKGROUND OF THE INVENTION

In the field of Internet-based communication, the Transfer Control Protocol (TCP) is the most widely used transmission protocol. It provides reliable end-to-end data communication services for Internet users. The TCP is a "slide window" protocol originally designed for fixed hosts and wired networks. By controlling the size of a proxy window, a data transmitting unit can control the rate of data transmission, and thus control the degree of network congestion. In a data packet transmission process, the transmitting unit first increases the size of the window linearly or exponentially, and then reduces the window to a half its size as soon as the lost of the packets occurs, whereupon the window size increases gradually again. In this way, the TCP detects the maximum transmission rate available in the network, and uses the packet loss to indicate whether the transmitting rate has exceeded the available bandwidth of the network.

The above-described conventional controlling method of the TCP is suitable for wired networks in which the bit error rate (BER) is low and the packet loss is mainly caused by network congestion. Unlike a wired network, however, a wireless network is characterized by high BER and mobility, and the errors of a link or movement of a host may lead to the loss of data packets. When the TCP is used in a wireless network, its performance deteriorates dramatically. The congestion control mechanism of the TCP is the main cause for performance deterioration of the TCP in the wireless network.

Currently, many schemes are proposed in order to improve the TCP for wireless networks. Depending on the basic principles, the schemes can be sorted into three types: end-to-end scheme, split connection scheme, and link layer scheme. In an end-to-end scheme, the transmitting unit handles the packet loss errors on both the wired network and the wireless network, and the TCP of the transmitting unit needs to be modified. In a split connection scheme, a connection is split into two sections at a mobile base station (MBS), one is a wired section from a fixed host to the MBS, and another is a wireless section from the MBS to a mobile host (MH). The split connection scheme does not require a modification of the TCP in the wired section. Only a modification of the TCP in the wireless section is needed. Through the splitting, the errors occurred in the wireless section can be hidden from the wired section, and the relatively stable transmission environment of the wired section is not affected by the complicated and volatile transmission environment of the wireless section. The link layer scheme combines a local retransmission mechanism with a forward error correction (FEC) mechanism, also aimed to hide various transmission errors related to the wireless section from the transmitting unit.

One of the TCP improvement schemes recently proposed for wireless networks is a Snoop protocol. The Snoop protocol belongs to the performance enhance proxy (PEP) technology. On a link layer (for example, the media access control (MAC) layer), the Snoop protocol introduces an Auto-Repeat Request (ARQ) mechanism for transmitting data packets, aimed at overcoming bit errors on wireless channels. On the network layer (for example, the Internet protocol (IP) layer), the Snoop protocol adopts a multicast technology to tackle the problem of incorrect packet reception caused by mobile handover. The Snoop protocol not only covers the transmission of application data from a host that corresponds to a MH (i.e. a Corresponding Host (CH)) to the MH, but also covers the data transmission in the opposite direction. When data packets are transmitted from the CH to the MH, a proxy program of the Snoop protocol at the MBS caches the data packets, and forwards the data packets to the MH. The Snoop protocol proxy detects incorrectly received data packets (including lost data packets hereinafter) on a wireless channel in two ways: one is setting a timeout retransmission timer similar to that of the TCP on the link layer; another is detecting, on the link layer, whether a Duplicate Acknowledgement (Dup Ack) packet, which is the same as a previous Acknowledgement (Ack) packet and which indicates a data packet or several data packets are not correctly received by the MH, occurs on a reversed path. When the Dup Ack packet occurs for the first time, the incorrectly received data packet(s) is (are) retransmitted to the MH by the MBS, and the subsequent Dup Ack packets, if any, are discarded. When the data is transmitted from the MH to the CH, the MBS checks whether there are discontinuous segments in the sequence numbers of the received data packets. Once discontinuous segments are discovered, an explicit loss notification is sent to the MH, indicating that the data packet needs to be retransmitted.

The inventor of the present invention finds that, like other local retransmission schemes, the Snoop protocol faces the problem of unable to have the transmitting unit completely free of the burden of dealing with the data packets that are not correctly received due to the volatility of the wireless section, especially in the cases where the wireless section is a multi-hop network in which a wireless path is composed by multiple links, or when such a wireless path is interrupted temporarily. When local retransmissions are performed repeatedly on a wireless path, the retransmission timer of the transmitting unit may expire, triggering a retransmission at the transmitting unit and a slow start of the congestion control mechanism, thus resulting in deterioration of the network performance.

SUMMARY OF THE INVENTION

The embodiments of the present invention disclose a method and an apparatus for controlling congestion of a wireless multi-hop network. When one or more data packets are not correctly received by a receiving unit in mobile host, a local retransmission is performed by a controlling apparatus according to state information of a wireless path to the mobile host, and the retransmission is notified to a transmitting unit from which the data packets are originated. Thus, futile data packet retransmissions by the transmitting unit can be reduced.

The method includes:

receiving an acknowledgment packet from the receiving unit;

if the state of the wireless path is not marked as unavailable, retransmitting one or more data packets that are not correctly received to the receiving unit at a high priority; and notifying the retransmission of the one or more data packets that are not correctly received to the transmitting unit.

The apparatus comprises a receiver, a controller and a transmitter;

the receiver is configured to receive an acknowledgement packet indicating one or more of the data packets are not correctly received from a receiving unit;

the controller is configured to determine whether a wireless path is marked as available, unavailable, congested or error according to the path information provided by an analyzer; and if the wireless path is not marked as unavailable, instruct the transmitter to retransmit the one or more data packets that are not correctly received at a high priority; and the transmitter is configured to retransmit the one or more data packets that are not correctly received according to the instruction of the controller, and notify the transmitting unit of the retransmission.

The method disclosed herein also includes obtaining the path information of the wireless path in the wireless multi-hop network, and the wireless path is marked by the controlling apparatus (one example of which is a Hybrid Performance Enhance Proxy unit (HPEP)) according to the path information as one of the following states: available, unavailable, congested or error. After a first Dup Ack packet is received from the receiving unit indicating that one or more data packets are not correctly received, the apparatus (e.g. the HPEP) performs a local retransmission of the data packets at a high priority for the data packets corresponding to the first Dup Ack packet if the wireless path is not marked as unavailable, and the retransmission event is notified to the transmitting unit. In this way, the transmitting unit is protected against the impact caused by the wireless section, and futile TCP retransmissions are avoided.

DETAILED DESCRIPTION OF THE EMBODIMENTS

In order to make the technical solutions, objectives and merits of the present invention clearer, the embodiments of the present invention is described in more details below with reference to the accompanying drawings.

The method for controlling congestion of a wireless multi-hop network is disclosed in an embodiment of the present invention.

Figure 1:
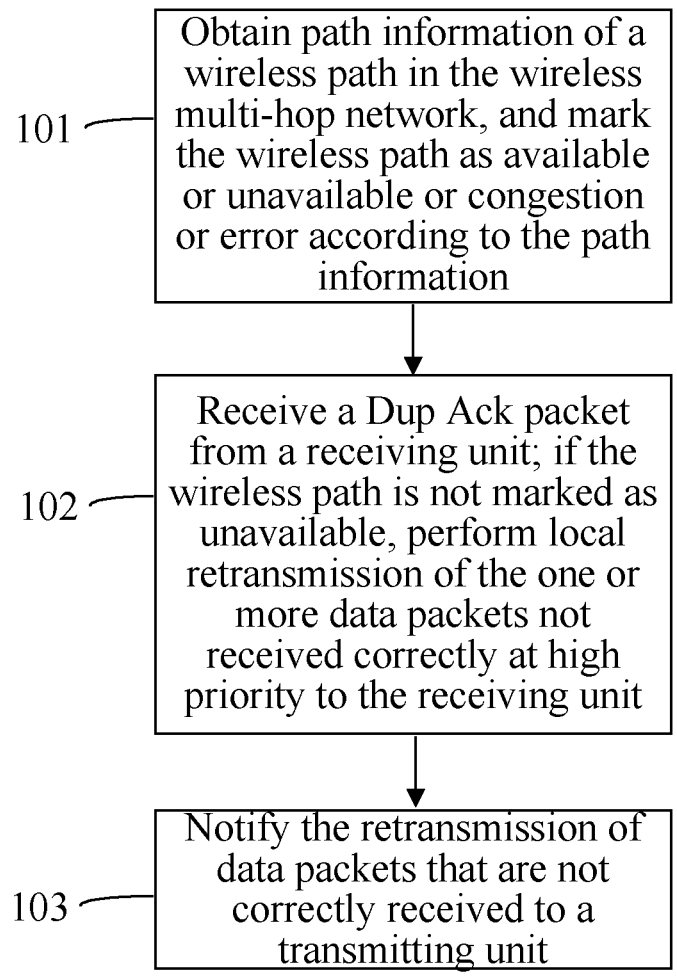
FIG. 1 is a flowchart of a method for controlling congestion of a wireless multi-hop network according to an embodiment of the present invention.

As shown in FIG. 1, the method includes:

Step 101: Obtaining path information of a wireless path in a wireless multi-hop network, and marking the wireless path as available or unavailable or congested or error according to the path information.

Step 102: Receiving a Dup Ack packet indicating one or more of the data packets are not correctly received from a receiving unit at the other end of the wireless path in response to data packets forwarded to the receiving unit; and if the wireless path is not marked as unavailable, performing a local retransmission of the one or more data packets not correctly received at a high priority to the receiving unit.

Step 103: Notifying the retransmission of the one or more data packets that are not correctly received to a transmitting unit.

Through the method disclosed herein, the path information of the wireless path in the wireless multi-hop network is obtained and the wireless path is marked accordingly. After a first Dup Ack packet is received from the receiving unit, if the wireless path is not marked as unavailable, a local retransmission is performed at a high priority for the one or more data packets corresponding to the first Dup Ack packet, and the retransmission event is notified to the transmitting unit. In this way, the transmitting unit in the wired section is protected against the impact caused by the wireless section, and futile TCP retransmissions by the transmitting unit are avoided.

Figure 2:
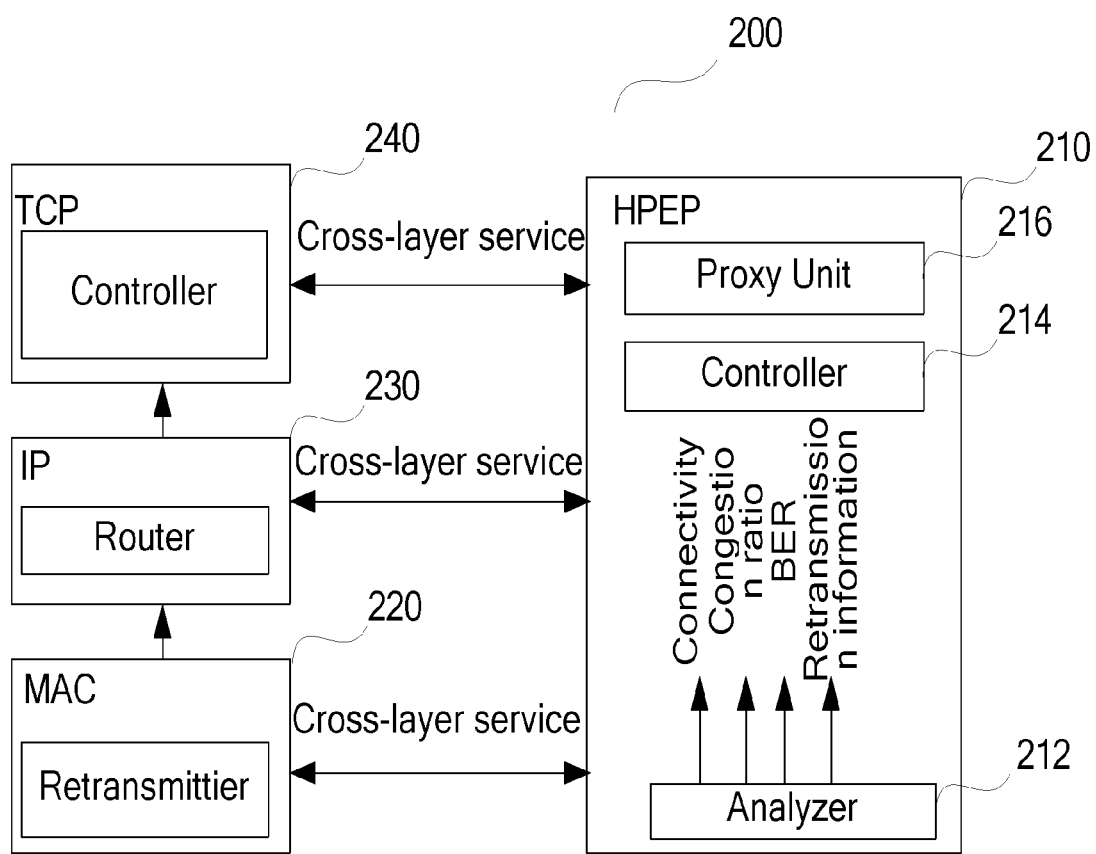
FIG. 2 is a block diagram of a controlling apparatus for controlling congestion of a wireless multi-hop network according to an embodiment of the present invention.

An apparatus for controlling congestion of a wireless multi-hop network is disclosed in another embodiment of the present invention. A system 200 comprises the apparatus (one example is a Hybrid Performance Enhance Proxy (HPEP)) 210. The apparatus 210 is connected with a link layer (MAC layer) 220, a network layer (IP layer) 230, and a transmission layer (TCP layer) 240 respectively in communication ways, as shown in FIG. 2. The apparatus 210 comprises an analyzer 212, a controller 214, and a proxy unit 216.

The analyzer 212 is configured to analyze the link(s) of a wireless path and the wireless path in the wireless multi-hop network. For example, the analyzer 212 is configured to collect statistics of the BER of the link(s) according to the information provided by the MAC layer such as Protocol Data Unit (PDU) information; or the analyzer 212 is configured to obtain status of the link(s), including break of the link(s), connection of the link(s), or combination thereof, and analyze the connectivity of the link(s) according to the information such as Received Signal Strength Indicator (RSSI) of the link(s); or the analyzer 212 is configured to obtain retransmission information such as maximum retransmission time according to the information provided by a retransmitter on the MAC layer such as ARQ parameters; or the analyzer 212 is configured to obtain the congestion ratio (i.e. a degree of congestion) of the wireless path according to the resource allocation information and queue length information provided by the MAC layer; or the analyzer 212 is configured to obtain optional wireless paths from the MBS to the MH according to the information provided by a router on the IP layer.

The controller 214 is configured to set a state of a wireless path, namely, mark the wireless path as one of the states (as aforementioned) according to the information provided by the analyzer 212.

The proxy unit 216 is configured to process the data packets and the Ack packets; and, after detecting a Dup Ack packet which indicates one or more of the data packets are not correctly received, identify the cause of the data packets not being correctly received based on the state of the wireless path marked by the controller 214, and determine to whether to perform a local retransmission of the incorrectly received packets or notify the transmitting unit to perform a normal retransmission of the incorrectly received packets.

The controlling apparatus of this embodiment can be used for bidirectional data transmission between the CH and the MH. For ease of description, it is assumed that the data packets are transmitted from the CH to the MH, and the Ack packets are transmitted from the MH to the CH. In this case, the above-mentioned transmitting unit is the CH or a functional unit of the CH, and the receiving unit is the MH or a functional unit of the MH.

Figure 3:
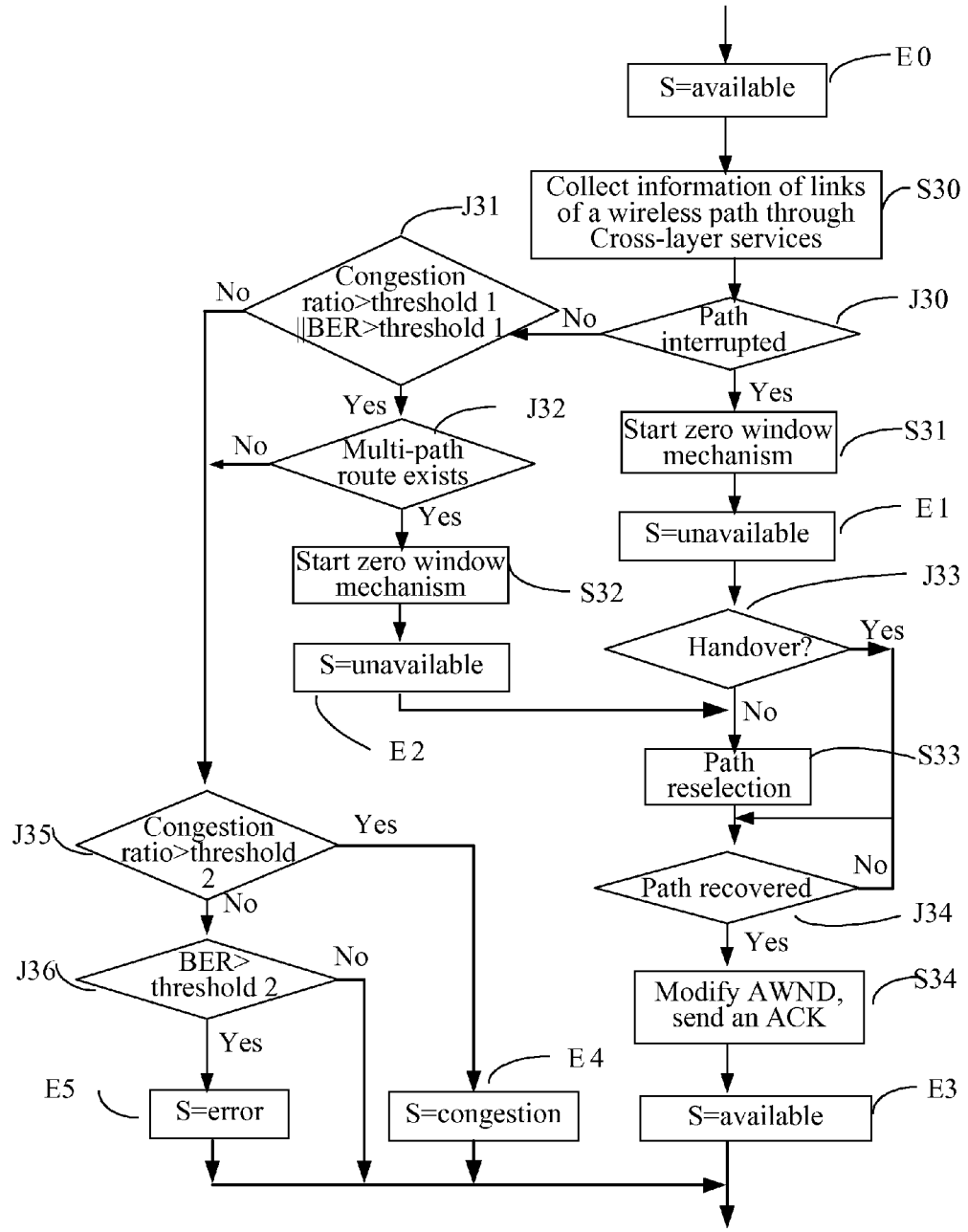
FIG. 3 is a flowchart of a process for setting a state of a wireless path according to an embodiment of the present invention.

The method of setting the state of e.g. the HPEP (here the state of the HPEP is the state of the wireless path) is shown in FIG. 3. For ease of description, the operation steps of the HPEP are sorted into three types which are labeled differently. In the serial number of steps, the execution steps are preceded by the letter S, the judgment steps are preceded by the letter J, and the state setting steps are preceded by the letter E. The steps of setting the state (E) may be deemed as independent steps, or combined with the execution steps (S). For ease of description below, the steps of setting the state (E) are placed together with the corresponding execution steps (S).

When the HPEP starts up, E0: the initial state S of a wireless path is set to S=available, and a value of a proxy window (PWND) for sending the data packets locally and a value of a congestion window (CWND) of the transmitting unit are set.

S30: The analyzer of the HPEP collects information of links of a wireless path in the wireless multi-hop network through cross-layer services; analyzes the information of links of the wireless path to obtain the path information. The path information includes: path congestion, connectivity, BER, or link-layer retransmission information, or any combination thereof.

J30: A judgment is made on whether the wireless path is interrupted or not according to the analysis result in S30. If the wireless path is "interrupted", the process proceeds to step S31; otherwise, the process proceeds to J31.

The HPEP may make the judgment according to the RSSI of the link(s) of the wireless path, trigger of a handover signaling or a handover event, or a Media Independent Handover (MIH) event. The judgment on whether the wireless path is interrupted is covered by the prior art, and is not repeated here any further.

S31: The proxy unit in the HPEP constructs a zero receiving window Ack, and starts up a zero window mechanism of the TCP. The state E1 of the HPEP is set as S=unavailable. The process then proceeds to J33.

The startup of the above zero window mechanism of the TCP includes: notify the transmitting unit to enter a persist mode, and freeze the retransmission timer of all data packets, without reducing the congestion window.

J33: A judgment is made on whether the wireless path interruption is caused by a terminal handover (i.e. the MH has been handed over). If the wireless path interruption is caused by the terminal handover, the process proceeds to J34; otherwise, the process proceeds to S33.

J31: A comparison is made between the current degree of congestion (Cng)) and its threshold, and between the current BER (Err) and its threshold. If the current BER is not lower than a first BER threshold $Err_{thr}^1$ ($Err \geq Err_{thr}^1$) or the current degree of congestion is not lower than a first congestion degree threshold $Cng_{thr}^1$ ($Cng \geq Cng_{thr}^1$), the process proceeds to J32; otherwise, the process proceeds to J35.

J32: A judgment is made on whether a connection to the receiving unit via the current wireless path has alternative wireless paths to route. If the connection has alternative paths to route, the process proceeds to S32; otherwise, the process proceeds to J35.

S32: The proxy unit in the HPEP constructs a zero receiving window Ack, and starts up a zero window mechanism of the TCP. The state E2 of the HPEP is set as S=unavailable. The process then proceeds to S33.

The above startup of the zero window mechanism of the TCP includes: notify the transmitting unit to enter a persist mode, and freeze the retransmission timer of all packets, without reducing the congestion window.

S33: The controller instructs a reselection of a new wireless path among the alternative wireless paths or among candidate wireless paths, and the process proceeds to J34.

J34: A judgment is made on whether the current wireless path is recovered. If the current wireless path is recovered, the process proceeds to S34; otherwise, the process proceeds to J34.

S34: The proxy unit modifies the value of an advertisement window (AWND), and sends three Ack packets in response to the last successfully received Zero Window Probe (ZWP) packet to the transmitting unit, or sends the latest Ack packet that comes from the receiving unit; so as to open the window of the transmitting unit and make it enter a fast transmission mode. The state E3 of the HPEP is set as S=available, and the PWND value and the CWND value of the transmitting unit are set. The AWND value here is not necessarily equal to the AWND value at the time of freezing, and it is set according to the currently available wireless link resources such as wireless path bandwidth and HPEP cache memory size.

J35: A comparison is made between the current degree of congestion (Cng) and a second congestion degree threshold ($Cng_{thr}^2$). If $Cng \geq Cng_{thr}^2$ (wherein $Cng_{thr}^1$ is greater than $Cng_{thr}^2$), the state E4 of the HPEP is set as S=congested; otherwise, the process proceeds to J36.

J36: A comparison is made between the BER (Err) and a second BER threshold ($Err_{thr}^2$). If $Err \geq Err_{thr}^2$ (wherein $Err_{thr}^1$ is greater than $Err_{thr}^2$), the state E5 of the HPEP is set as S=error; otherwise, the state of the HPEP is normal, namely, the initial state E0 of the HPEP "S=available" is maintained.

After the foregoing analysis and processing, the state of the HPEP (namely, the state of the wireless path) may have one of the following state values:

S=available, corresponding to the E0 state or the E3 state, indicating that the wireless path is normal;

S=unavailable, corresponding to the E1 state or the E2 state when the wireless path is not recovered, indicating that the wireless path is either interrupted or unavailable;

S=congested, corresponding to the E4 state, indicating the wireless path is congested; and S=error, corresponding to the E5 state, indicating a transmission error has occurred in the wireless path.

Unless an external triggering occurs (for example, a re-initialization command is received), the HPEP collects statistics of the path congestion and the BER within the Round-Trip Time of wireless (RTTw) on every wireless path, and refreshes the states of the wireless paths accordingly.

After setting the states of the wireless paths, the HPEP needs to process the data packets received from the transmitting unit and the Ack packets received from the receiving unit according to the path state of a wireless path. It is worth noting that, from the perspective of the initial state, the HPEP needs to process the TCP data packets earlier than the Ack packets (because an Ack packet is generated only after data packet or data packets are sent). From the perspective of the corresponding relation, the HPEP processes data packets first, and then processes the Ack packet(s) corresponding to the data packets. However, without emphasizing the corresponding relation, the HPEP processes the data packets and the Ack packets in no particular order after the first RTTw after the initialization.

Figure 4:
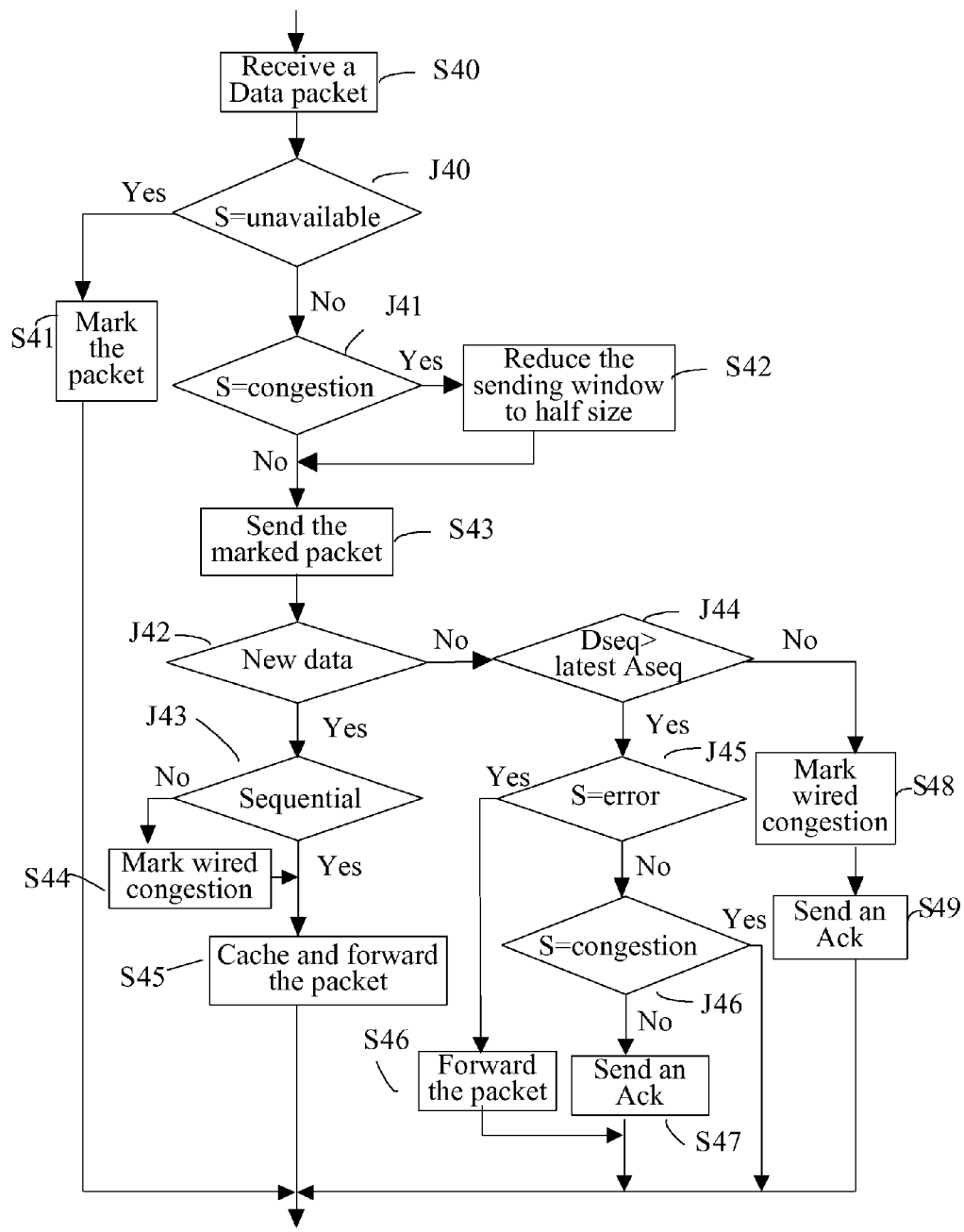
FIG. 4 is a flowchart of processing a data packet in a method for controlling congestion of a wireless multi-hop network according to an embodiment of the present invention.

The following describes how the HPEP processes data packets. The detailed steps are shown in FIG. 4. In the serial number of steps, the execution steps are preceded by the letter S, and the judgment steps are preceded by the letter J.

S40: The HPEP receives a data packet, and the process proceeds to J40.

J40: A judgment is made on whether the state of the HPEP is S=unavailable. If the state of the HPEP is S=unavailable, indicating the current wireless path is unavailable, and the process proceeds to S41; otherwise, the process proceeds to J41.

S41: The data packet is marked. If the data packet is not cached, cache the data packet.

J41: A judgment is made on whether the state of the HPEP is S=congested. If the state of the HPEP is S=congested, indicating the current wireless path is congested, the sending rate of the data packet needs to be controlled, and the process proceeds to S42; otherwise, the process proceeds to S43.

S42: The sending window of the HPEP is reduced, for example, to half, in order to control the sending rate. The process proceeds to S43.

S43: The data packet marked in S41 before (rather than the data packet received in S40) is sent to the receiving unit at a high priority, and then the process proceeds to J42.

J42: A judgment is made on whether the data packet received in S40 is new to the HPEP. If the data packet received in S40 is new, the process proceeds to J43; otherwise, the process proceeds to J44.

J43: A judgment is made about whether the serial number of the new data packet increases sequentially. If the serial number increases sequentially, the process proceeds to S45; otherwise, the process proceeds to S44.

S44: If the serial number of the new data packet does not increase sequentially, the wired path is congested, and the HPEP needs to mark the wired path congested. The process then proceeds to S45.

S45: The new data packet is cached and forwarded to the receiving unit.

J44: A judgment is made on whether the serial number of the data packet is greater than the serial number in the latest Ack packet. If the serial number of the data packet is greater than the serial number in the latest Ack packet, the process proceeds to J45; otherwise, the process proceeds to S48. If the serial number of the data packet is greater than the serial number in the latest Ack packet, the downlink wireless path from the MBS to the MH may be congested (for example, the data packet has not arrived) or the wireless link is erroneous (for example, the data packet does not arrive at the MH correctly), or the Ack packet is unable to arrive at the MBS because the uplink wireless path of the MH is congested.

J45: A judgment is made on whether the state of the HPEP is S=error. If the state of the HPEP is S=error, the process proceeds to S46; otherwise, the process proceeds to J46.

S46: If the state of the HPEP is S=error, indicating the downlink wireless path is not congested. In this case, the HPEP forwards the data packet and increases the local retransmission count of the proxy unit.

J46: A judgment is made on whether the state of the HPEP is S=congested. If the state of the HPEP is S=congested, indicating the downlink wireless path is congested, the HPEP does not process the data packet; otherwise, the uplink wireless path is congested, and the process proceeds to S47.

S47: In place of the MH, the HPEP sends a new Ack packet to the CH at a high priority to prevent a retransmission by the transmitting unit.

S48: If the serial number of the data packet is smaller than the serial number in the latest Ack packet, the MH has received the data packet correctly, the Ack packet has been sent to the MBS, and the wireless path is not congested. In this case, the wired path is congested and it needs to be marked, and the process proceeds to S49.

S49: A new Ack packet is sent to the CH at a high priority.

Figure 5:
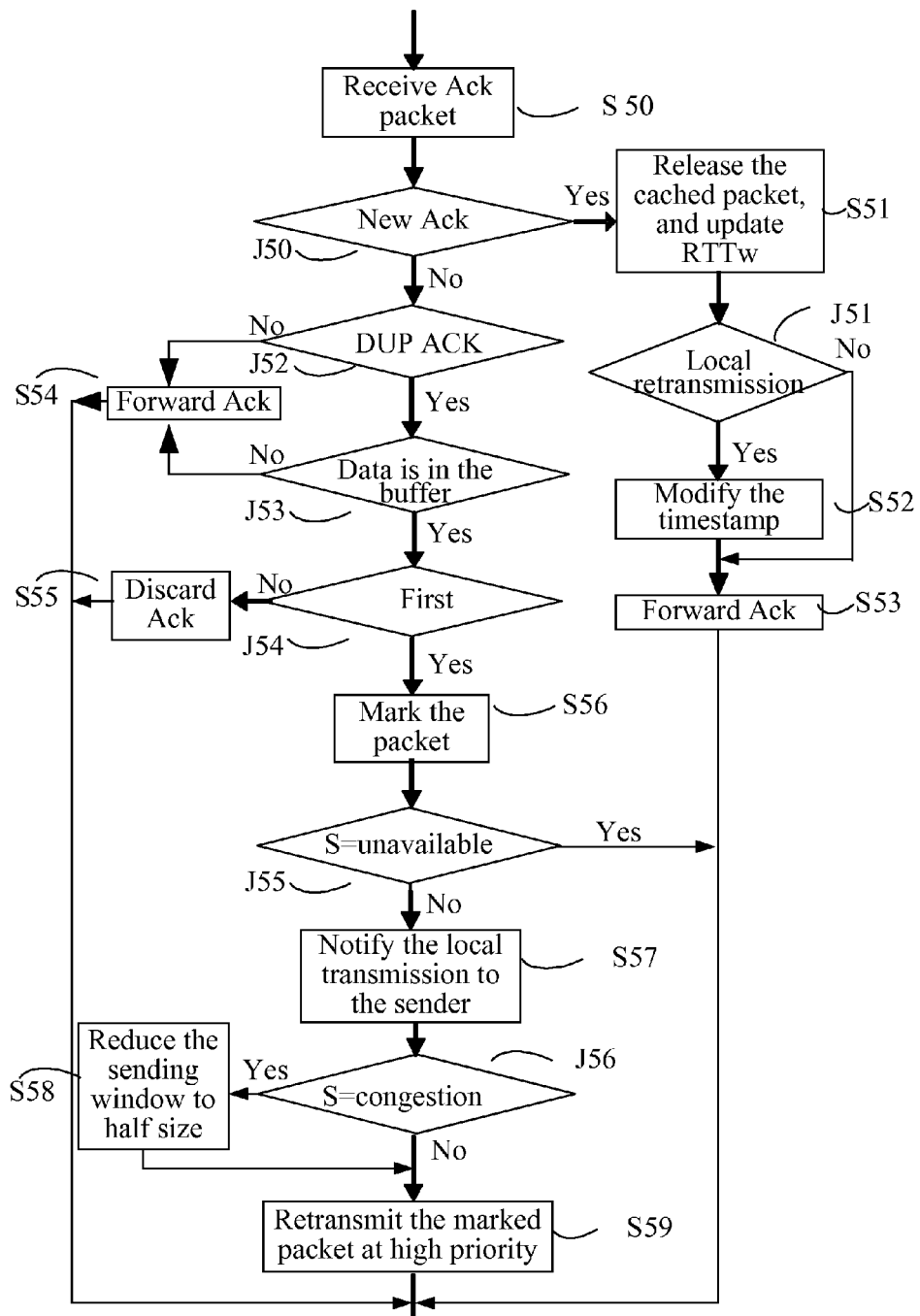
FIG. 5 is a flowchart of processing an acknowledgement packet in a method for controlling congestion of a wireless multi-hop network according to an embodiment of the present invention.

The following describes how the HPEP processes Ack packets. The detailed steps are shown in FIG. 5. In the serial number of steps, the execution steps are preceded by the letter S, and the judgment steps are preceded by the letter J.

S50: The HPEP receives an Ack packet, and the process proceeds to J50.

J50: A judgment is made on whether the Ack packet is new. If the Ack packet is new, no data packet is lost recently, and the process proceeds to S51; otherwise, the process proceeds to J52.

S51: The acknowledged packet in the cache memory of the HPEP is released, and the estimate value of the RTTw in the wireless path is updated. The process proceeds to J51.

J51: A judgment is made on whether the data packet corresponding to the Ack packet has undergone a local retransmission by the HPEP. If the data packet corresponding to the Ack packet has undergone a local retransmission, the process proceeds to S52; otherwise, the process proceeds to S53.

S52: The local retransmission of the data packet at the HPEP affects the estimation of the RTT at the transmitting unit. In order to avoid such impact, the timestamp of the Ack packet needs to be modified according to a retransmission count. The setting of the RTT correction parameter d depends on the local retransmission count. That is, the RTT correction parameter is an accumulative value of local timeout, namely, $$d = \sum_i TO_{Re}^i,$$

where i is retransmission count, and $TO_{Re}^i$ is every timeout value of the local retransmission timer. The HPEP modifies the timestamp field ($T_{send}$) of the Ack packet to obtain $T_{send}'$. Without considering the impact, the formula is as follows:

$$T_{send}' = T_{send} + d$$

$$RTT = T_{ack\text{-}recp} - T_{send}' = T_{ack\text{-}recp} - T_{send} - d$$

After the timestamp is modified, the process proceeds to S53.

After the timestamp is modified, the value of d may be cleared to zero. Alternatively, the value of d is not cleared, but the first timeout value $TO_{Re}^1$ of the local retransmission timer overwrites the original d value directly at the next modification of the timestamp.

S53: The Ack packet is forwarded to the CH.

J52: A judgment is made on whether the Ack packet is a Dup Ack, namely, whether the Dup Ack is the same as the previous Ack. If the Ack packet is a Dup Ack packet, the receiving unit does not receive the expected data packet correctly, but the subsequent data packets are received successfully, and the process proceeds to J53; otherwise, the process proceeds to S54.

J53: A judgment is made on whether the data packet not received correctly by the receiving unit exists in the cache memory of the HPEP. If the data packet exists in the cache memory, the process proceeds to J54; otherwise, the CH needs to be notified to retransmit the data packet, and the process proceeds to S54.

S54: The Ack packet is forwarded to the CH.

J54: A judgment is made on whether the Dup Ack packet is the first Dup Ack packet, namely, whether the HPEP receives only one Dup Ack packet whose content is the same as the Ack packet before receiving the Dup Ack packet. If the Dup Ack packet is the first Dup Ack packet, the process proceeds to S56; otherwise, the process proceeds to S55. After receiving the first Dup Ack packet, the proxy unit may calculate the maximum possible number of arriving Dup Ack packets, which is equal to the number of all data packets transmitted after transmitting an incorrectly received data packet normally and before retransmitting the incorrectly received data packet. The proxy also calculates the value of the serial number of the Ack packet expected after the error is cleared, and this value is equal to the serial number of the latest Ack packet before the error plus 1.

S55: The Dup Ack packet is discarded. If the Dup Ack packet is not the first Dup Ack packet, because the incorrectly received data packet corresponding to the Dup Ack packet has been retransmitted when the first Dup Ack packet arrives, no more retransmission is required.

S56: The HPEP marks the data packet corresponding to the Dup Ack packet so that the marked data packet can be retransmitted after the wireless path recovers in the case that the local retransmission fails subsequently. The process proceeds to J55.

J55: A judgment is made on whether the state of the HPEP is S=unavailable. If the state of the HPEP is S=unavailable, the current wireless path is unavailable; otherwise, the process proceeds to S57.

S57: The HPEP notifies the transmitting unit that the HPEP will perform local retransmission, and then the process proceeds to J56. The details of the notification are as follows: The HPEP sends a zero window notification to the transmitting unit; after receiving the zero window notification, the transmitting unit stops sending any data packets, and freezes all retransmission timers and congestion windows to avoid retransmission contention caused by data packet retransmission. Afterward, the HPEP waits for the Window Probe message from the transmitting unit. When receiving the first ZWP message from the transmitting unit, the HPEP sends a window update message so that the transmitting unit continues to send data packets and does not send the ZWP to the receiving unit.

J56: A judgment is made on whether the state of the HPEP is S=congested. If the state of the HPEP is S=congested, the sending rate of the data packets needs to be controlled, and the process proceeds to S58; otherwise, the process proceeds to S59.

S58: The proxy window is reduced, for example, to half, in order to control the sending rate. The process proceeds to S59.

S59: The data packet marked in S56 is retransmitted to the receiving unit at a high priority. Before receiving the data packet, the receiving unit returns a Dup Ack packet for every received data packet. In order to minimize Dup Ack packets, the marked data packets need to be sent to the receiving unit at a high priority.

It is worth noting that the HPEP also performs retransmission triggered by overflow of the timer, in addition to the retransmission triggered by the type and the number of the Ack packets. Upon timeout of the timer, the HPEP needs to retransmit the first unacknowledged data packet in the connection, but, unlike the retransmission triggered by TCP timer overflow, the HPEP does not perform the slow startup process. The timeout value $TO_{Re}$ of the local retransmission timer of the HPEP is updated according to the $RTT_w$ value of the round trip from the HPEP to the receiving unit. Upon receiving a new Ack packet, the HPEP obtains the $RTT_w$ of the wireless section. The method of updating $TO_{Re}$ is similar to the scenario of the TCP:

$$SRTT_w = \alpha SRTT_w + (1-\alpha) RTT_w$$

$$Err = RTT_w - SRTT_w$$

$D = \beta D + (1-\beta)Err$, $\alpha$ and $\beta$ are smoothing factors, which are recommended to be 0.8-0.9 and are typically 7/8.

$$TO_{Re} = SRTT_w + 4D$$

The detailed retransmission process starts from S56, which is consistent with the foregoing steps.

The TCP context information that needs to be maintained by the HPEP includes: cached data packets, PWND value, the latest Ack packet, timeout value of local retransmission timer, local retransmission flag, and local retransmission count. When serving MBS is changed, the TCP context information of the HPEP needs to be forwarded to the new MBS as handover context. If the MBS supports Media Independent Handover Function (MIHF), the information services of the MIH may be used to interact.

Through the method in this embodiment, the HPEP collects the information on the MAC layer/physical (PHY) layer, IP layer, and TCP layer through cross-layer services, the analyzer obtains path information according to the information, and the controller marks the state of the wireless path according to the path information; once detecting a data packet is not correctly received, the link-layer retransmission is coordinated with the local retransmission, and the local retransmission is coordinated with the TCP retransmission to protect the transmitting unit against the impact caused by the wireless section and avoid futile TCP retransmission.

Figure 6:
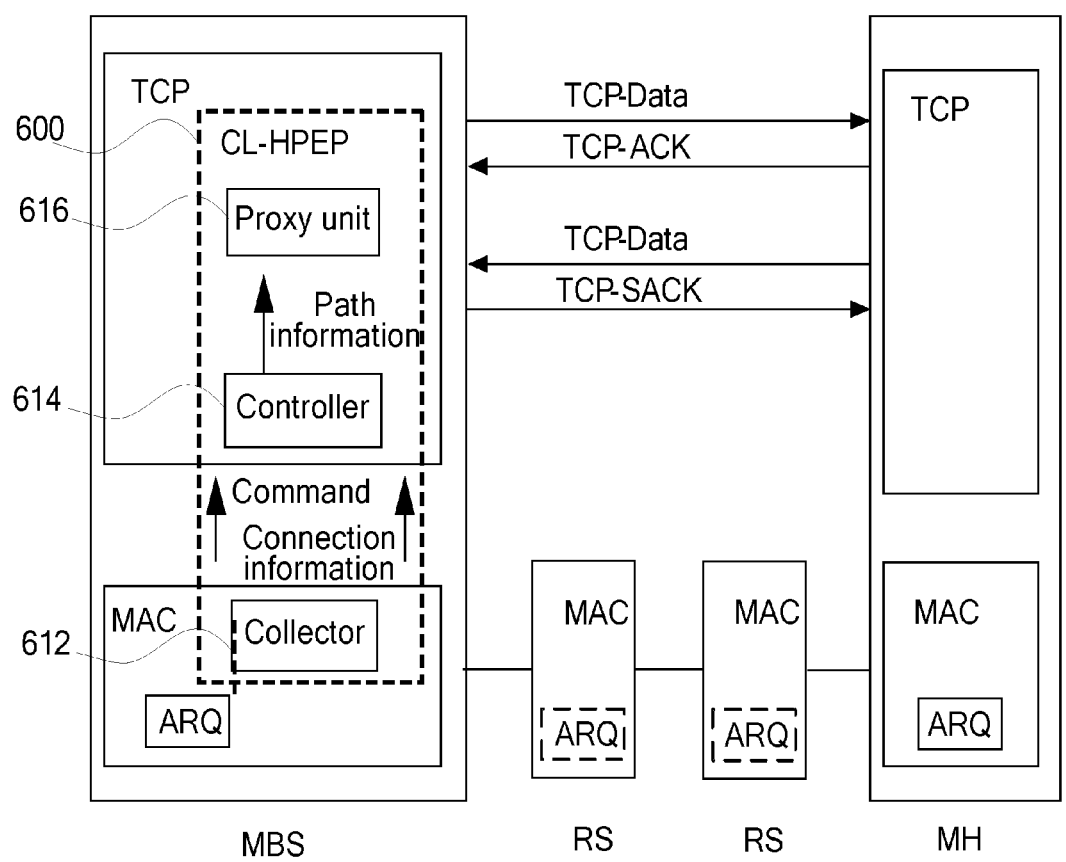
FIG. 6 is a block diagram of a controlling apparatus for controlling congestion of a wireless multi-hop network according to an embodiment of the present invention.

A system for controlling congestion of a wireless multi-hop network is disclosed in an embodiment of the present invention. One example of the multi-hop network is a wireless relay network. In the wireless relay network, the traditional TCP protocol is adopted for communications from the CH to the MH, and Selective Acknowledgment (SACK) is adopted for communications from the MH to the CH. The system comprising an HPEP 600 is shown in FIG. 6.

The collector 612 on the MAC layer collects the information of links of a wireless path, including the signal strength parameters such as RSSI and ARQ of the links, and reports an event when a MAC frame is accepted successfully or a cached frame is discarded.

The controller 614 collects statistics of the path connectivity and the BER within the RTT of the wireless section according to the information reported by the collector 612, monitors the congestion of the wireless path to obtain the path information, and adjusts the processing of the proxy unit 616 and the MAC layer accordingly.

(1) Obtaining Degree of Congestion of a Wireless Path

In order to obtain the degree of congestion of the wireless path, it is necessary to know the bandwidth of the bottleneck link. Traditionally, the bandwidth of the bottleneck link is obtained through the Ack packet. However, because the receiving unit may delay sending the Ack packet, the traditional method is not accurate. In a wireless relay network, each intermediate node knows the length of its own cache queue, but the MBS does not know, unless some change to the signaling delivery and intermediate nodes occurred to make the MBS aware the length of the queue cached by each intermediate node and then, the MBS calculates the bandwidth of the bottleneck link according to the length of the queue cached by each intermediate node. However, this method is not extensible. In this embodiment of the present invention, a ZWP method is applied, and the HPEP sends ZWP packets $Z_0$ and $Z_1$ to the MH. It is assumed that the time interval of returning of the $Z_0$ and $Z_1$ is $\Delta_t = D_{r1} - D_{r0}$ and both $Z_0$ and $Z_1$ are known to be equal to $L_{zwp}$, the sample of the end-to-end bandwidth (namely, bottleneck bandwidth) can be calculated through the following formula:

$$B^n_{sample} = \frac{L_{zwp}}{\Delta_t}$$

After a lowpass smoothing, the smoothed bottleneck bandwidth is obtained as follows:

$$B^n_{neck} = (1-\eta)B^{n-1}_{neck} + \frac{\eta}{2}(B^n_{sample} + B^{n-1}_{sample})$$

In the equation above, $\eta$ is a smoothing factor, for example, $\eta = 2/21$.

The degree of congestion of the wireless path is:

$$Cng = \frac{PWND \times \text{Size\_seg} - B^n_{neck} \times RTT_{min}/RTT_w}{PWND \times \text{Size\_seg}}$$

In the equation above, $RTT_{min}$ is the minimum round-trip delay on the wireless path, which is approximately equal to the RTT of the packet on the wireless path without queue delay. Size_seg is the size of a data segment.

(2) Obtaining the Bit Error of the Wireless Path

Once an Ack packet is received, the HPEP makes statistic sampling for the data packets sent by the retransmitter of the MBS within the RTTw. It is assumed that the total number of sent data packets is $S^n_{total}$. Once an Ack packet in response to the data packet is received from the MS, the HPEP collects statistics of the data packets sent successfully. It is assumed that the number of data packets sent successfully is $S^n_{success}$, the sampling BER of the wireless path is:

$$Err^n_{sample} = 1 - S^n_{success}/S^n_{total}$$

The smoothed BER of the wireless path is:

$$Err^n = (1-\eta)Err^{n-1} + \frac{\eta}{2}(Err^n_{sample} + Err^{n-1}_{sample})$$

In the equation above, $\eta$ is a smoothing factor, for example, $\eta = 2/21$.

The proxy unit 616 is responsible for processing the data packets and Ack packets. If the proxy unit 616 detects that a packet from the MH is not correctly received by the proxy unit 616, the proxy unit 616 uses SACK to perform selective acknowledgement, and notifies the MH to retransmit only the incorrectly received packet. If the proxy unit 616 detect that a packet from the CH is not correctly received by the MH, the proxy unit 616 performs a local retransmission or a wireless path reselection according to the path information of the wireless section.

In the wireless relay network according to the IEEE802.16j, the ARQ retransmission of a retransmitter on the MAC layer comes in three modes: end-to-end, two-links, and hop-by-hop. Regardless of the retransmission mode, after the MBS sends the data packet, if no Ack packet is received from the MH, the MBS discards the data packet after expiry of the ARQ_BLOCK LIFE_TIME. In this case, the HPEP timeout retransmission mechanism needs to be used for retransmitting the data packet. If an R-Ack packet is received from a downstream relay node, the MBS waits for the Ack packet from the MH. If a No-ACK (N-ACK) packet is received from the MH, the MBS discards the data packet, and waits for the HPEP timeout retransmission. On the relay link and the access link, if the upstream node of the MH receives an N-ACK or ARQ_RETRY_TIMEOUT, the upstream node performs the MAC layer retransmission.

In order to reduce the retransmission delay, the retransmitter on the MAC layer reports an ARQ_BLOCK LIFE_TIME event and an N-ACK event. As triggered by the event, the HPEP can perform local data packet transmission in time.

In order to avoid conflict between the local retransmission of the HPEP and the ARQ retransmission of the retransmitter on the MAC layer and avoid futile HPEP retransmission, the ARQ_BLOCK LIFE_TIME value set by the HPEP needs to be smaller than the timeout value $TO_{Re}$ of the HPEP retransmission timer.

It is worth noting that the operation steps of the HPEP are similar to those in the previous embodiment, and are not repeated here any further.

Through the method of this embodiment, the collector 612 on the MAC layer collects and analyzes the information of links of the wireless path, the controller 612 obtains the path information, and adjusts the parameters of the proxy unit 616 and the retransmitter on the MAC-layer; and performs operations hierarchically when a data packet is not correctly received. In this way, the transmitting unit is protected against the impact caused by the wireless section, and futile TCP retransmission and local retransmission are avoided.

Another controlling apparatus for controlling congestion of a wireless multi-hop network is disclosed in an embodiment of the present invention. The controlling apparatus comprises a HPEP 700, and the HPEP 700 has an MIHF unit 712.

Figure 7:
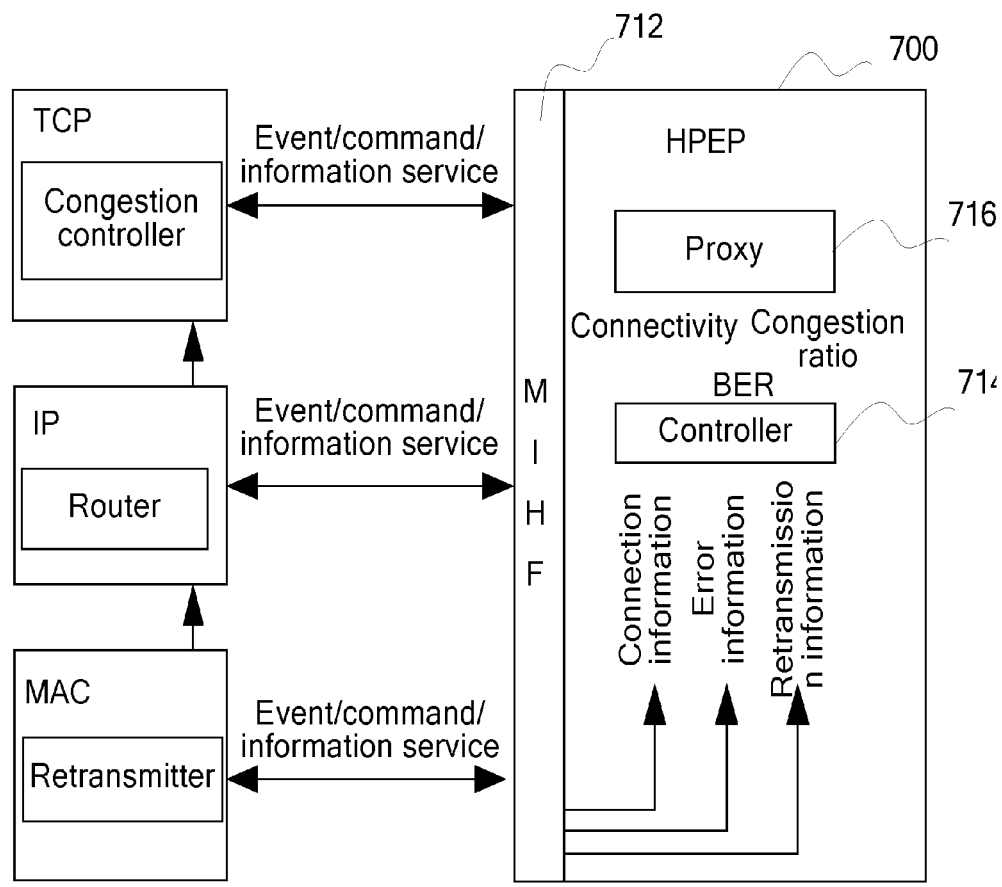
FIG. 7 is a block diagram of a controlling apparatus for controlling congestion of a wireless multi-hop network according to an embodiment of the present invention.

As shown in FIG. 7, the HPEP 700 with an MIHF 712 is installed in an MBS node. An MH has a corresponding MIHF unit. According to the information of links of a wireless path provided by the MIHF, including connection information, error information and retransmission information, a controller 714 of the HPEP 700 is configured to obtain the connectivity and the BER of the wireless path, and sets the retransmission time parameter of a retransmitter on the MAC layer according to the retransmission information of the links. The controller 714 may be further configured to obtain the degree of congestion of the wireless path according to a probe mechanism.

Through the MIHF command service "MIH_Event_Subscribe.request", the controller 714 of the HPEP registers the MIHF link state event "MAC and PHY State Change event", and registers the link parameter event and the link transmission event, thus obtaining the availability of the link, Received Signal Strength (RSS), BER, result of data packet transmission, and connectivity of the link. By extending the event service of the MIHF, the HPEP registers the ARQ_BLOCK LIFE_TIME event and the N-ACK event of the retransmitter on the MAC layer so that the proxy unit 716 can start the local retransmission in time. By extending the command service of the MIHF, the controller 714 sets the ARQ retransmission time "ARQ_BLOCK LIFE_TIME" for the retransmitter on the MAC layer so that the ARQ_BLOCK LIFE_TIME value should be smaller than $TO_{Re}$, thus avoiding futile local retransmission.

Optionally, by extending the command service of the MIHF, the controller 714 uses an MIHF command service "MIH_Link_Get_Parameters" to obtain the information of links of the wireless path directly.

It is worth noting that the operation steps of the HPEP 700 are similar to those in the previous embodiment, and are not repeated here any further.

Through the method in this embodiment, the HPEP 700 collects the information of links of the wireless path through the MIHF 712, the controller 714 obtains the path information, and adjusts the parameters of the proxy and the retransmitter on the MAC-layer by extending registration of the event of the MIHF; and performs operations hierarchically when data packet(s) is not correctly received. In this way, the transmitting unit is protected against the impact caused by the wireless section, and futile TCP retransmission is avoided.

Figure 8:
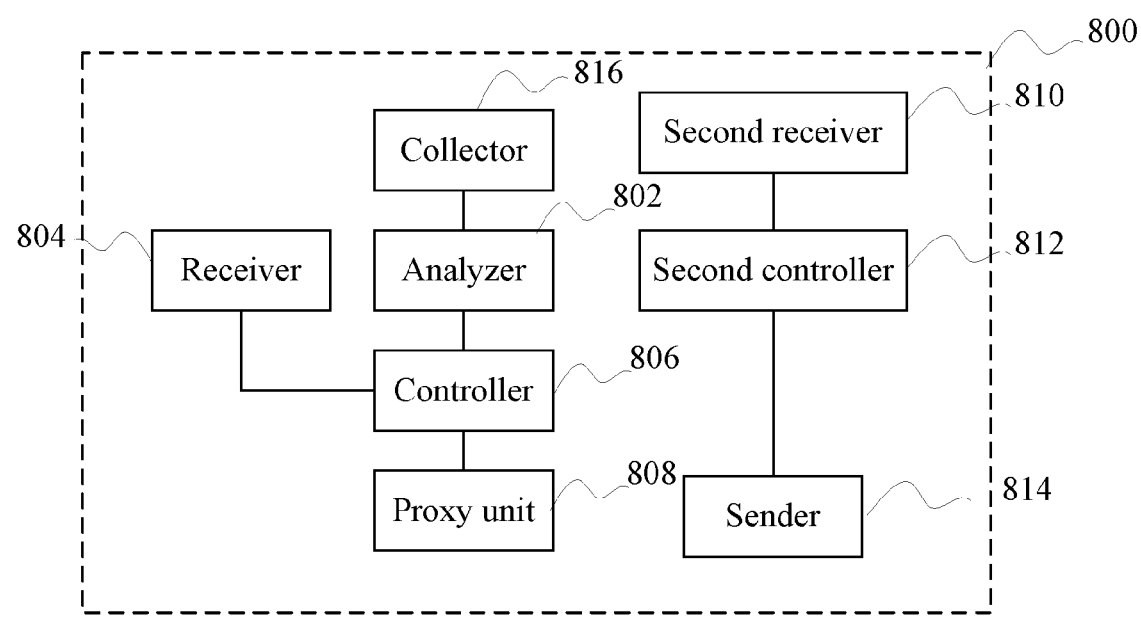
FIG. 8 is a block diagram of a controlling apparatus for controlling congestion of a wireless multi-hop network according to an embodiment of the present invention.

Another controlling apparatus for controlling congestion of a wireless multi-hop network is disclosed in another embodiment of the present invention. As shown in FIG. 8, the controlling apparatus 800 comprises an analyzer 802, a receiver 804, a controller 806 and a proxy unit 808.

The analyzer 802 is configured to analyze path information of a wireless path in a wireless multi-hop network according to information of links of the wireless path in the wireless multi-hop network.

The receiver 804 is configured to receive an Ack packet from a receiving unit at the end of the wireless path.

The controller 806 is configured to mark the wireless path as available, unavailable, congested or error according to the path information provided by the analyzer 802; if the wireless path is not marked as unavailable, instruct the proxy unit 808 to perform local retransmission at a high priority for a data packet that is not received correctly by the receiving unit corresponding to a first Dup Ack packet received by the receiver 804, and notify an event of the local retransmission to a transmitting unit.

The proxy unit 808 is configured to perform local retransmission according to the instruction of the controller 806.

Optionally, the controller 806 is further configured to set the timeout value of an ARQ timer of the retransmitter on the MAC layer.

Optionally, the controller 806 is further configured to instruct the MAC layer to perform wireless path reselection.

Optionally, the controlling apparatus 800 further includes a second receiver 810, a second controller 812, and a sender 814.

The second receiver 810 is configured to receive the data packet from the transmitting unit.

The second controller 812 is configured to mark the data packet received by the second receiver 810, or instruct the sender 814 to forward the data packet to the receiving unit at the end of the wireless path or instruct the sender 814 to return an Ack packet to the transmitting unit according to the state of the wireless path.

The sender 814 is configured to send a data packet to the receiving unit or send an Ack packet to the transmitting unit according to the instruction of the second controller 812.

Optionally, the controlling apparatus 800 further includes a collector 816, which is configured to collect information of links of the wireless path in the wireless multi-hop network, and send the information of links of the wireless path to the analyzer 802.

The analyzer 802 is configured to receive the information of links of the wireless path from the collector, and analyze the path information of the wireless path in the wireless multi-hop network according to the information of the links of the wireless path.

The collector 816 may be located in the MAC layer independently or is a functional unit of an MIHF.

Through the controlling apparatus 800 in the present invention, the analyzer 802 obtains the path information, and the controller 806 marks the state of the wireless path according to the path information, and processes the data packets according to different states of the wireless path. In the case of data packet(s) not being correctly received, the controller 806 instructs the MAC layer to perform a wireless path reselection or instructs the proxy unit 808 to perform a local retransmission of the data packet. In this way, the transmitting unit is protected against the impact caused by the wireless section, and futile TCP retransmission is avoided. By setting a timeout value of the ARQ timer of the retransmitter on the MAC layer, the apparatus avoids futile local retransmission.

Through the method and the apparatus disclosed in the embodiments of the present invention, the HPEP obtains the path information, and marks the state of the wireless path according to the path information, and processes the data packets according to different states of the wireless path. In the case if one or more data packets are not correctly received, the HPEP instructs the MAC layer to perform a wireless path reselection or instructs the proxy unit 808 to perform a local retransmission of the data packets. In this way, the transmitting unit is protected against the impact caused by the wireless section, and futile TCP retransmission is avoided. By setting a timeout value of the ARQ timer of the retransmitter on the MAC layer, the HPEP avoids futile local retransmission.

The above embodiments are merely provided for describing the technical solutions of the present invention, and are not intended to limit the scope of the present invention. It is apparent to persons skilled in the art that various modifications and variations can be made without departing from the scope of the invention, and the present invention is intended to cover the modifications and variations provided that they fall in the scope of protection defined by the following claims or their equivalents.

What is claimed is:

1. A method of controlling congestion of a wireless multi-hop network for use by a controlling apparatus, comprising:
    receiving data packets from a transmitting unit and forwarding the data packets to a receiving unit via a wireless path of the wireless multi-hop network;
    receiving acknowledgement packets from the receiving unit indicating whether the data packets are correctly received or not;
    if an acknowledgement packet indicates that one or more of the data packets are not correctly received, determining whether the wireless path is marked as unavailable or not;
    if the wireless path is not marked as unavailable, retransmitting the one or more data packets that are not correctly received to the receiving unit at a higher priority over normal transmission of the data packets, notifying the transmitting unit the retransmission of the one or more data packets to the receiving unit;

determining whether the wireless path is interrupted before obtaining path information of the wireless path;

if the wireless path is interrupted, marking the wireless path as unavailable and instructing the transmitting unit to enter a persist mode, freezing retransmission timer of all data packets, and maintaining the size of a congestion window, so as to notify the transmitting unit;

if the wireless path is not interrupted, judging whether a degree of congestion of the wireless path is higher than a first congestion degree threshold and whether a Bit Error Rate (BER) of the wireless path is higher than a first BER threshold;

if a congestion ratio of the wireless path is higher than the first congestion degree threshold or the BER of the wireless path is higher than the first BER threshold, judging whether there is an alternative wireless path to the wireless path;

if the degree of the congestion of the wireless path is higher than the first congestion degree threshold or the BER of the wireless path is higher than the first BER threshold and the alternative wireless path to the wireless path exists, marking the wireless path as unavailable and instructing the transmitting unit to enter the persist mode, freezing the retransmission timer of all data packets, and maintaining the size of the congestion window, so as to notify the transmitting unit;

if the de ee of congestion of the wireless path is higher than the first congestion degree threshold or the BER of the wireless path is higher than the first BER threshold but there is no alternative wireless path to the wireless path, or, if the degree of the congestion of the wireless path is not higher than the first congestion degree threshold and the BER of the wireless path is not higher than the first BER threshold, judging whether the degree of the congestion of the wireless path is higher than a second congestion degree threshold;

if the degree of the congestion of the wireless path is higher than the second congestion threshold, marking the wireless path as congested;

if the degree of the congestion of the wireless path is lower than or equal to the second congestion degree threshold, judging whether the BER of the wireless path is hither than a second BER threshold; and if the BER of the wireless path is higher than the second BER threshold, marking the wireless path as error.

2. The method of claim 1, further comprising:

obtaining path information of the wireless path; and marking state of the wireless path as one of the following according to the path information:

available;

unavailable;

congested; and error.

3. The method of claim 2, wherein before obtaining the path information of the wireless path, the method further comprises:

marking the wireless path as available, and setting a value of a proxy window (PWND) for forwarding the data packets to the receiving unit to be equal to a value of a congestion window (CWND) of the transmitting unit.

4. The method of claim 2, wherein obtaining the path information of the wireless path in the wireless multi-hop network comprises:

collecting information of links of the wireless path in the wireless multi-hop network through cross-layer services; and analyzing the information of links of the wireless path to obtain the path information.

5. The method of claim 2, wherein obtaining the path information of the wireless path in the wireless multi-hop network comprises:

collecting information of links of the wireless path in the wireless multi-hop network through a collector on a Media Access Control (MAC) layer; and obtaining the path information by analyzing the information of links of the wireless path.

6. The method of claim 1, further comprising:

caching the data packets received from the transmitting unit;

wherein the one or more data packets that are retransmitted to the receiving unit are obtained from the cached data packets.

7. The method of claim 6, wherein the method further comprises:

returning an Ack packet to the transmitting unit;

wherein returning the Ack packet to the transmitting unit comprises:

judging whether the data packet received from the transmitting unit is a new data packet;

if the data packet is not new data packet, judging whether a serial number of the data packet is greater than a serial number in a latest Ack packet; and if the serial number of the data packet is not greater than the serial number in the latest Ack packet, or, if the serial number of the data packet is greater than the serial number in the latest Ack packet and the state of the wireless path is not error, returning the Ack packet to the transmitting unit.

8. The method of claim 1, further comprising:

modifying a value of an advertisement window (AWND) after the interrupted wireless path recovers from the interruption;

sending an acknowledgement packet in response to a last successfully received Zero Window Probe (ZWP) packet to the transmitting unit, or sending a latest acknowledgement packet from the receiving unit to the transmitting unit;

marking the wireless path as available; and setting the value of the PWND for forwarding the data packets to the receiving unit to be equal to the value of the CWND of the transmitting unit.

9. The method of claim 1, further comprising:

obtaining the degree of congestion of the wireless path from the path information;

wherein obtaining the degree of congestion comprises:

sending Zero Window Probe (ZWP) packets $Z_0$ and $Z_1$ to the receiving unit;

calculating a time interval of returning $Z_0$ and $Z_1$ as $\Delta_t = D_{t1} - D_{t0}$, wherein a length of both $Z_0$ and $Z_1$ are equal to $L_{zwp}$, and a sample of a bottleneck bandwidth is:

$$B_{sample}^n = \frac{L_{zwp}}{\Delta_t};$$

performing a lowpass smoothing to obtain a smoothed bottleneck bandwidth according to:

$$B_{neck}^n = (1-\eta)B_{neck}^{n-1} + \frac{\eta}{2}(B_{sample}^n + B_{sample}^{n-1})$$

wherein η is a smoothing factor; and
determining the degree of congestion according to:

$$Cng = \frac{PWND \times Size\_seg - B_{neck}^n \times RTT_{min}/RTT_w}{PWND \times Size\_seg},$$

wherein $RTT_{min}$ is a minimum round-trip delay on the wireless path.

10. The method of claim 1, further comprising:
obtaining the BER of the wireless path from the path information;
wherein obtaining the BER of the wireless path comprises:
after receiving an acknowledgement packet from the transmitting unit, performing a statistic sampling of the retransmitted data packets to obtain a BER of sampling of the wireless path; and
obtaining a smoothed BER based on the BER of sampling;
wherein the BER of sampling of the wireless path is:

$$Err_{sample}^n = 1 - S_{success}^n / S_{total}^n$$

where $S_{total}^n$ a total number of the sampled data packets, and $S_{success}^n$ is a number of data packets sent successfully, and
wherein the smoothed BER of the wireless path is:

$$Err^n = (1-\eta)Err^{n-1} + \frac{\eta}{2}(Err_{sample}^n + Err_{sample}^{n-1}),$$

where η is a smoothing factor.

11. The method of claim 1, further comprising:
waiting for recovery of the wireless path if the interruption of the wireless path is caused by a handover; or
performing wireless path reselection or sending an instruction for wireless path reselection if the interruption of the wireless path is not caused by a handover.

12. The method of claim 1, wherein if the wireless path is marked as unavailable, the method further comprises:
marking the data packets that are not correctly received.

13. The method of claim 12, wherein before forwarding the data packets to the receiving unit, the method further comprises:
sending the data packet marked previously but not sent successfully.

14. The method of claim 1, wherein the acknowledgement packet indicating that the data packets are correctly received is an Ack packet, and the data packet indicating that the data packets are not correctly received is a Dup Ack packet, and wherein the retransmission of the one or more data packets that are not received correctly is performed after a first Dup Ack packet is received.

15. A controlling apparatus for controlling congestion of a wireless multi-hop network, comprising:
a receiver, configured to receive data packets from a transmitting unit and receive acknowledgement packets from a receiving unit;
a transmitter, configured to forward the data packets to the receiving unit via a wireless path of the wireless multi-hop network; and retransmit one or more data packets that are not correctly received to the receiving unit according to instructions of a controller, and notify the transmitting unit of the retransmission; and
the controller associated with the receiver, configured to
(a) determine from the received acknowledgement packets whether the data packets are correctly received;
(b) instruct the transmitter to retransmit the one or more data packets that are not correctly received at a high priority over normal transmission of the data packet if the wireless path is not marked as unavailable;
(c) mark the wireless path as unavailable if the wireless path is interrupted;
(d) determine whether there is an alternative wireless path to the wireless path if a degree of congestion is higher than a first congestion degree threshold or a Bit Error Rate (BER) of the wireless path is higher than a first BER threshold;
(e) mark the wireless path as unavailable if the alternative wireless path to the wireless path exists and the BER of the wireless path is higher than the first BER threshold;
(f) mark the wireless path as congested if the degree of the congestion of the wireless path is higher than a second congestion threshold;
(g) determine whether the BER of the wireless path is higher than a second BER threshold if the degree of congestion of the wireless path is less than or equal to the second congestion degree threshold; and
(h) mark the wireless path as error if the BER of the wireless path is higher than the second BER threshold.

16. The apparatus of claim 15, wherein the controlling apparatus further comprises:
an analyzer, configured to analyze path information of the wireless path in the wireless multi-hop network according to information of links of the wireless path in the wireless multi-hop network;
wherein the controller is further configured to mark state of the wireless path as available, unavailable, congested or error according to the path information provided by the analyzer.

17. The apparatus of claim 16, wherein:
the controller is further configured to perform a wireless path reselection or send an instruction for performing the wireless path reselection.

18. The apparatus of claim 15, wherein the controlling apparatus is a mobile base station or a functional unit of the mobile base station, the transmitting unit is a fixed host or a functional unit of the fixed host in a wired network, and the receiving unit is a mobile host or a functional unit of the mobile host in a wireless network.

19. The apparatus of claim 15, further comprising:
a collector, configured to collect the information of links of the wireless path in the wireless multi-hop network, and send the information of links of the wireless path to the analyzer,
wherein the analyzer is further configured to receive the information of links of the wireless path from the collector, and analyzes the path information of the wireless path in the wireless multi-hop network according to the information of links of the wireless path.

20. The apparatus of claim 15, further comprising a cache memory configured to cache the data packets received from the transmission unit, wherein the one or more data packets that are retransmitted to the receiving unit are obtained from the cached data packets.

* * * * *

UNITED STATES PATENT AND TRADEMARK OFFICE
CERTIFICATE OF CORRECTION

PATENT NO. : 8,593,954 B2  
APPLICATION NO. : 13/007682  
DATED : November 26, 2013  
INVENTOR(S) : Hongcheng Zhuang It is certified that error appears in the above-identified patent and that said Letters Patent is hereby corrected as shown below:

In the Claims:

Column 15, Claim 1, line 30 "if the de ee of congestion" should read --if the degree of congestion--.

Column 15, Claim 1, line 45 "path is hither" should read --path is higher--.

Column 17, Claim 10, line 25 "$Err_{sample}$" should read -- $Err^n_{sample}$ --.

Signed and Sealed this  
Eighteenth Day of March, 2014

Michelle K. Lee  
*Deputy Director of the United States Patent and Trademark Office*